United States Patent [19]

Petersen et al.

[11] 3,980,009

[45] Sept. 14, 1976

[54] APPARATUS FOR PREPARING AN ELONGATED EDIBLE PRODUCT

[75] Inventors: Gunnar Christian Petersen, Odense; Ole Thisgaard, Hjallese; Steen Wiig, Naesby, all of Denmark

[73] Assignee: Dansk Andels Aegexport, Copenhagen V, Denmark

[22] Filed: Nov. 26, 1975

[21] Appl. No.: 635,547

[30] Foreign Application Priority Data

Nov. 29, 1974 Denmark .......................... 6240/74

[52] U.S. Cl. .................................. 99/353; 99/383; 99/428
[51] Int. Cl.² .............................................. A23P 1/00
[58] Field of Search ..................... 99/353, 354–355, 99/356, 380–381, 382–383, 384, 404, 426, 427–428

[56] References Cited
UNITED STATES PATENTS

| | | | |
|---|---|---|---|
| 1,139,037 | 5/1915 | Huth | 99/428 X |
| 1,674,033 | 6/1928 | Carpenter | 99/383 |
| 1,719,931 | 7/1929 | Hall | 99/428 UX |
| 1,984,027 | 12/1934 | Lyons | 99/353 UX |
| 2,282,500 | 5/1942 | Sohn | 99/381 |
| 2,563,866 | 8/1951 | Puls | 99/354 |
| 2,604,841 | 7/1952 | Kirby | 99/353 X |
| 2,700,939 | 2/1955 | Liston | 99/353 UX |
| 3,158,087 | 11/1964 | Hedglin | 99/428 |
| 3,424,076 | 1/1969 | Bernatz et al | 99/426 X |
| 3,747,508 | 7/1973 | Elam, Sr. | 99/354 |

*Primary Examiner*—Peter Feldman
*Assistant Examiner*—Arthur O. Henderson
*Attorney, Agent, or Firm*—Sughrue, Rothwell, Mion, Zinn and Macpeak

[57] ABSTRACT

An apparatus for preparing elongated products having a cylindrical shell enclosing a core material. The apparatus comprises a plurality of cylindrical moulds each associated with a core member which is laterally supported in a frame moving in unison with the moulds through the apparatus. Fluent raw materials are supplied to each mould and caused to solidify to form the finished products. The core members are axially displaceable in the supporting frame, and each core member is lowered into the associated mould before any of the raw materials is supplied. It is withdrawn from the mould when the material of the shell has been sufficiently solidified to permit the withdrawal. Before being withdrawn the core member may be rotated through a fraction of a revolution to facilitate its release from the product shell. When in their raised position, the core members are held against axial displacement and rotation by detent means on the frame.

12 Claims, 11 Drawing Figures

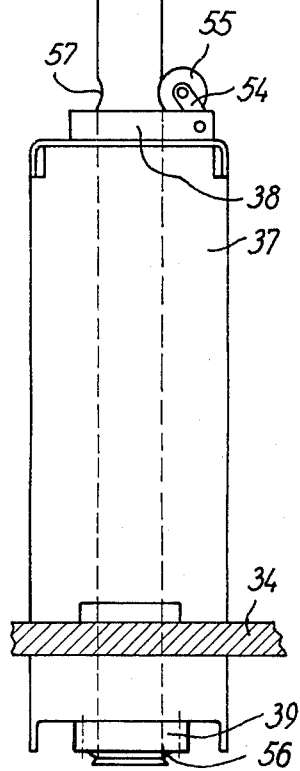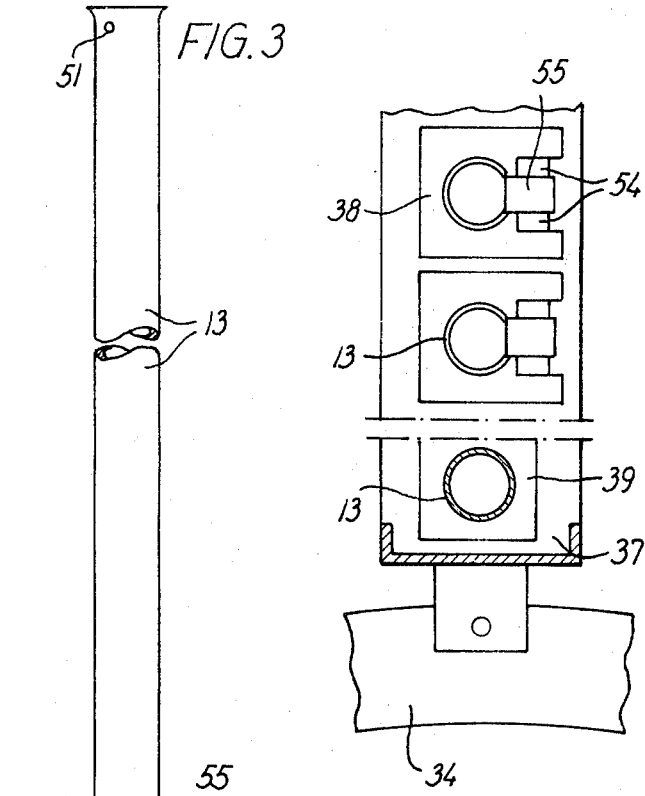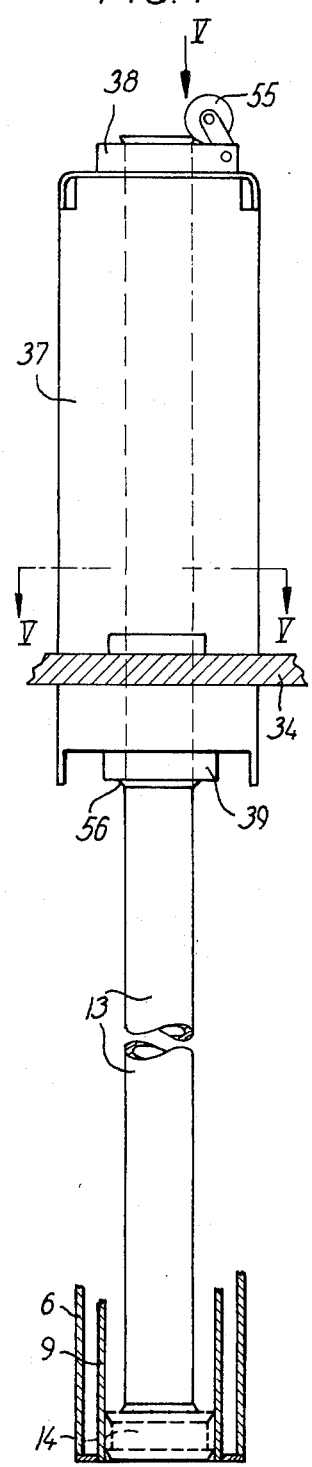

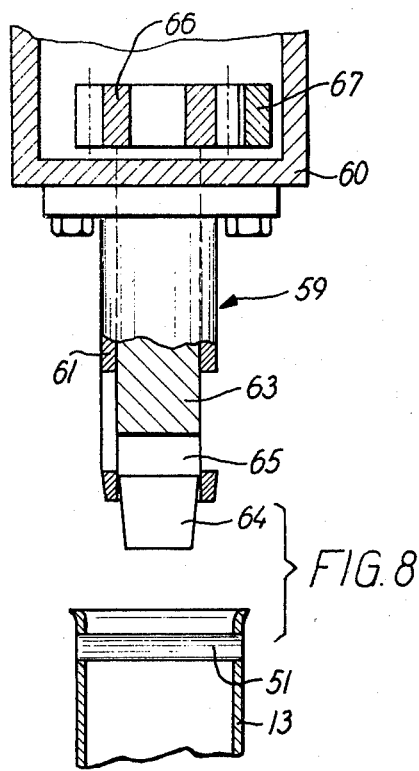
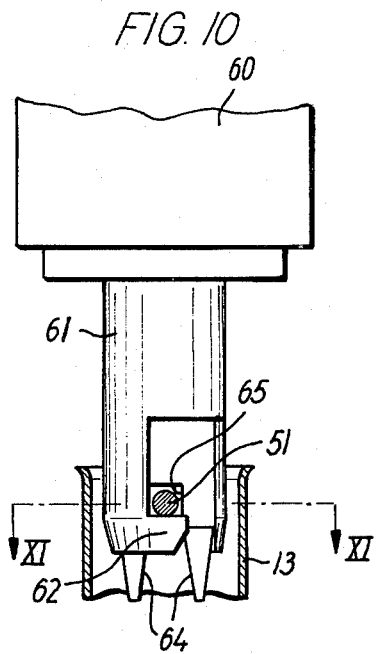
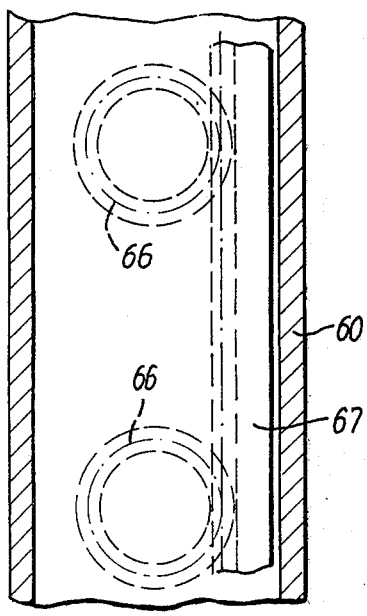
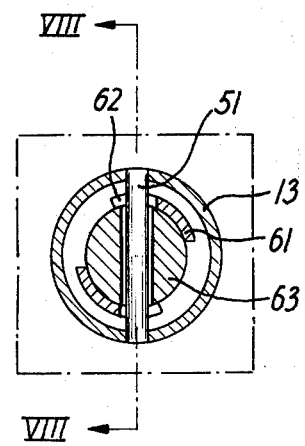

APPARATUS FOR PREPARING AN ELONGATED EDIBLE PRODUCT

BACKGROUND OF THE INVENTION

The present invention relates to apparatus for preparing an elongated edible product including two product components which are supplied in a flowable state into the annular space defined between an outer mould and a core member arranged internally of the mould and into the space formed by the core member, respectively, and which are caused to solidify in the mould. The apparatus comprises a plurality of vertically oriented cylindrical moulds open at their upper ends and closed at their lower ends, means for moving the moulds through a plurality of stations including a station for inserting a core member in each mould and a station for later withdrawing the core member, each of said stations being provided with vertically movable gripper means for engaging the core members, one or more stations for supplying metered amounts of the above mentioned fluent raw materials, and a station for withdrawing finished products from the moulds.

U.S. Pat. specification No. 3,823,659 discloses an apparatus of the kind referred to in which each core member is constituted by a tube, the upper end of which is formed with an outwardly directed flange. The flange serves for withdrawing the tube by means of a bifurcated gripper engaging with the underside of the flange. When the tube is withdrawn from the mould, the gripper pushes it onto a vertical mandrel suspended from an arm which subsequently rotates the mandrel and the core tube from the withdrawal station to the core inserting station in which a second bifurcated gripper is brought in engagement with the upper side of the flange following which the gripper moves downwardly and inserts the tube in a different mould. The mechanism necessary for effecting the movement of the mandrel is rather bulky, and it is difficult to design a practical mechanism for an apparatus the moulds of which are arranged in a plurality of concentric circles or parallel rows, which would be advisable for obtaining an economically acceptable production rate.

SUMMARY OF THE INVENTION

According to the present invention there is provided an apparatus for preparing an elongated edible product including a cyclindrical core comprising a first product component, and a surrounding cylindrical shell comprising a second product component, said apparatus comprising:

a plurality of vertically oriented cylindrical moulds open at their upper ends and closed at their lower ends, means for cyclically moving said moulds through a plurality of stations including a station for inserting a core member in each mould, a station for withdrawing the core member from the mould, at least one station for supplying said second product component in a flowable state to the annular space defined between the inner wall of the mould and said core member, and supplying said first product component in a flowable state to the space formed by the core member, and a station for withdrawing the finished products from the moulds, means between said material supply station and said product withdrawal station for causing the product components to solidify, a frame rigidly connected with said moulds so as to move in unison therewith, means on said frame for slidingly supporting a plurality of said core members with one core member located above each mould, first gripper means in said core insertion station for cooperating with said core member, and drive means for vertically reciprocating said first gripper means, second gripper means in said core withdrawal station for cooperating with said core members, and drive means for vertically reciprocating said second gripper means, said first and second gripper means and said core members having interengageable coupling means shaped so as to define a fixed angular position of each core member relative to said frame when said coupling means are engaged.

Due to the fact that each core member participates in the cyclical movement of the associated mould through the apparatus and remains aligned with respect to the mould, the design of the apparatus is considerably simplified. In particular, the distance between the core insertion and withdrawal stations is not definitely fixed as in the known apparatus mentioned above. On the contrary, the apparatus can readily be designed so as to permit adjustments of the spacing between the stationary gripper means in the respective stations, as measured along the path in which the moulds move without necessitating any change of the cycle period and hence of the production rate. A further advantage is that in particular the gripper means in the core withdrawal station can be utilized for effecting a slight rotation of the core prior to the withdrawal thereof, which in some cases facilitates the release of the core from the solidified product in the mould and thus counteracts the risk that the product surface might be damaged due to adhesion to the core.

Preferably the coupling means on the core member is a radially extending coupling pin and the coupling means of the first and second gripper means includes a downwardly divergent, V-shaped notch for receiving said pin. This ensures the proper function of the gripper means irrespectively of minor, unintentional angular displacements which the core may have been subjected to during the period in which it is only supported by the travelling frame and, hence, not positively prevented from such displacements. Preferably, at least the upper end of the core is tubular or hollow, in which case the coupling pin may extend transversely all through the core.

The gripper means provided in the core insertion station may comprise a sleeve in which said V-shaped notch is formed, a ball located within said sleeve and spring means biasing said ball downwardly to engage with the coupling pin when the latter is located in the bottom of the V-shaped notch. This embodiment ensures that during the insertion and in particular during the final phase thereof, in which the core is to be brought into sealing contact with the mould bottom, the core will be subjected to a predetermined axial force delivered by the spring means acting upon the ball.

In the core withdrawal station the gripper means may comprise a sleeve, a centrally located gripper member surrounded by said sleeve and formed with said V-shaped notch, two opposed, upwardly open hooks being provided at the lower end at said sleeve and shaped for engaging below said coupling pin, and means for effecting a relative rotation of said sleeve and said centrally located gripper member.

On the core supporting frame there may be mounted a plurality of pressure pads, one associated with each core member, and spring means biasing each pressure pad radially inwards against the associated core member. The pressure pads serve to hold the cores frictionally in their lifted or retracted position, and they may furthermore be utilized for ensuring a predetermined sealing force between each core and mould bottom if they are located such that when the core is in its bottom position, the associated pressure pad overlies the upper end of the core so that the spring force on the pad urges the core downwardly.

The pressure pad may be in the form of a rotatable roller which reduces the friction and resulting wear on the pad and the core surface.

The lateral wall of the core member may be formed with a depression in which the associated pressure pad may engage when the core member is lifted clear of the mould. This ensures a certain positive positioning of the core in its retracted position and prevents it from unintentionally moving downwards and possibly penetrating into the partially solidified product in the mould, e.g. due to vibrations in the apparatus.

When the moulds are arranged in groups each consisting of a plurality of moulds located side by side, the gripper means in the core withdrawal station may be mounted on a common holder provided with means for aligning each gripper relative to the associated core member when the holder is in its lowermost position. This ensures that the cooperating coupling means on the grippers and the cores can be brought in proper engagement without any lateral movement of the cores which might result in damage to the surface of the solidified products in the moulds.

BRIEF DESCRIPTION OF THE DRAWINGS

A preferred embodiment of the invention will now be described in detail with reference to the accompanying schematical drawings in which FIG. 3 is a vertical elevation, partly in section, and on a still larger scale showing a frame supporting a tubular core in lifted or retracted position, FIG. 4 is a corresponding view of the core in the lower or inserted position, FIG. 5 is a fractional view of the frame as viewed in the direction of arrow V and in the section along line V—V in FIG. 4, respectively, FIG. 8 is a view corresponding to FIG. 6 and showing a gripper in the core withdrawal station and the upper end of the core before withdrawal thereof, taken as a section along line VIII—VIII in FIG. 11, FIG. 9 is a plan view of FIG. 8, FIG. 10 is a view corresponding to FIG. 8 and showing the component parts after the gripper has engaged with the coupling pin of the core, and FIG. 11 is a section along line XI—XI in FIG. 10.

DETAILED DESCRIPTION

Figure 1:
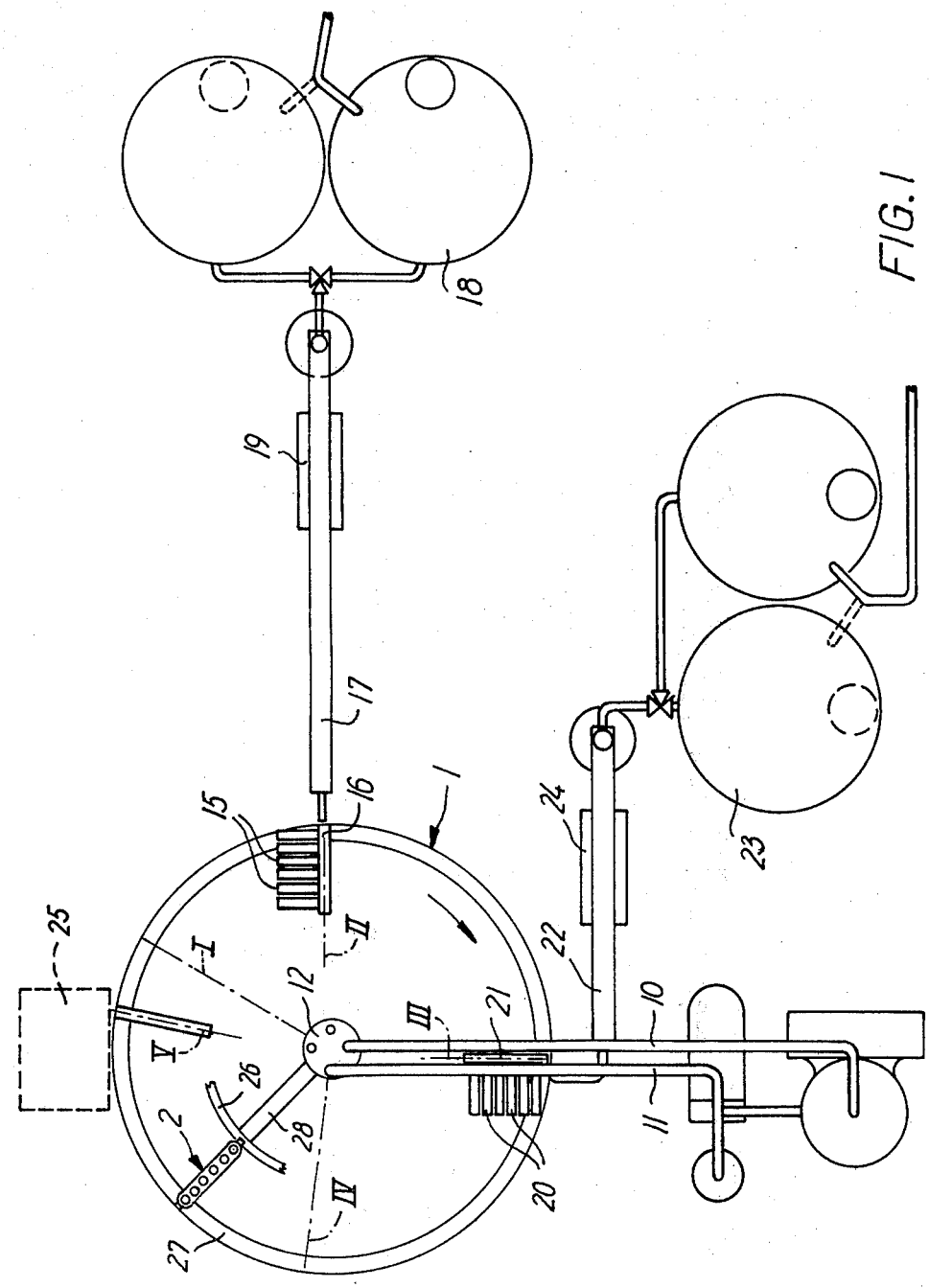
FIG. 1 is a plan view of the apparatus together with some ancillary equipment, for illustrating the manufacturing process carried out in the apparatus.

The apparatus illustrated in the drawings comprises a turret, generally designed by 1, which carries a plurality of radially extending mould sectors 2. In the embodiment shown there is a total of 32 sectors each having six mould chambers. The frame 3 of the apparatus, which is shown quite diagramatically in FIG. 2, includes a vertically oriented central column 4 about which the turret 1 is rotatable, and which is supported by feet 5.

The turret is rotated intermittently about the column 4 in steps each corresponding to the angular spacing between two successive mould sectors 2, by means of a drive mechanism (not shown) which may comprise a toothed ring secured to the periphery of the turret or an endless roller chain welded thereto, and a drive pinion or sprocket which is rotated from a drive motor through a ratchet device.

Figure 7:
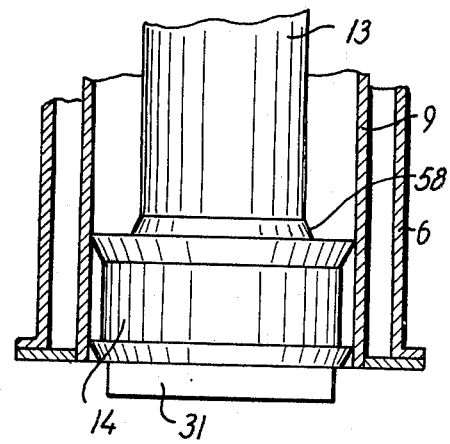
FIG. 7 is a vertical section showing the lower end of the core engaging with a bottom plug in the associated mould.

Each mould sector, see also FIGS. 4 and 7, comprises a vertical shell 6 which is closed at its top and bottom by means of upper and lower cover plates. Each cover plate is formed with six apertures in which six mould cylinders 9 are sealingly secured. The annular space between shell 6 and moulds 9 may be divided in superposed chambers which are mutually connected by pipes or other suitable means (not shown) creating an expedient flow path through the mould sector for a heating medium and a cooling medium.

Figure 2:
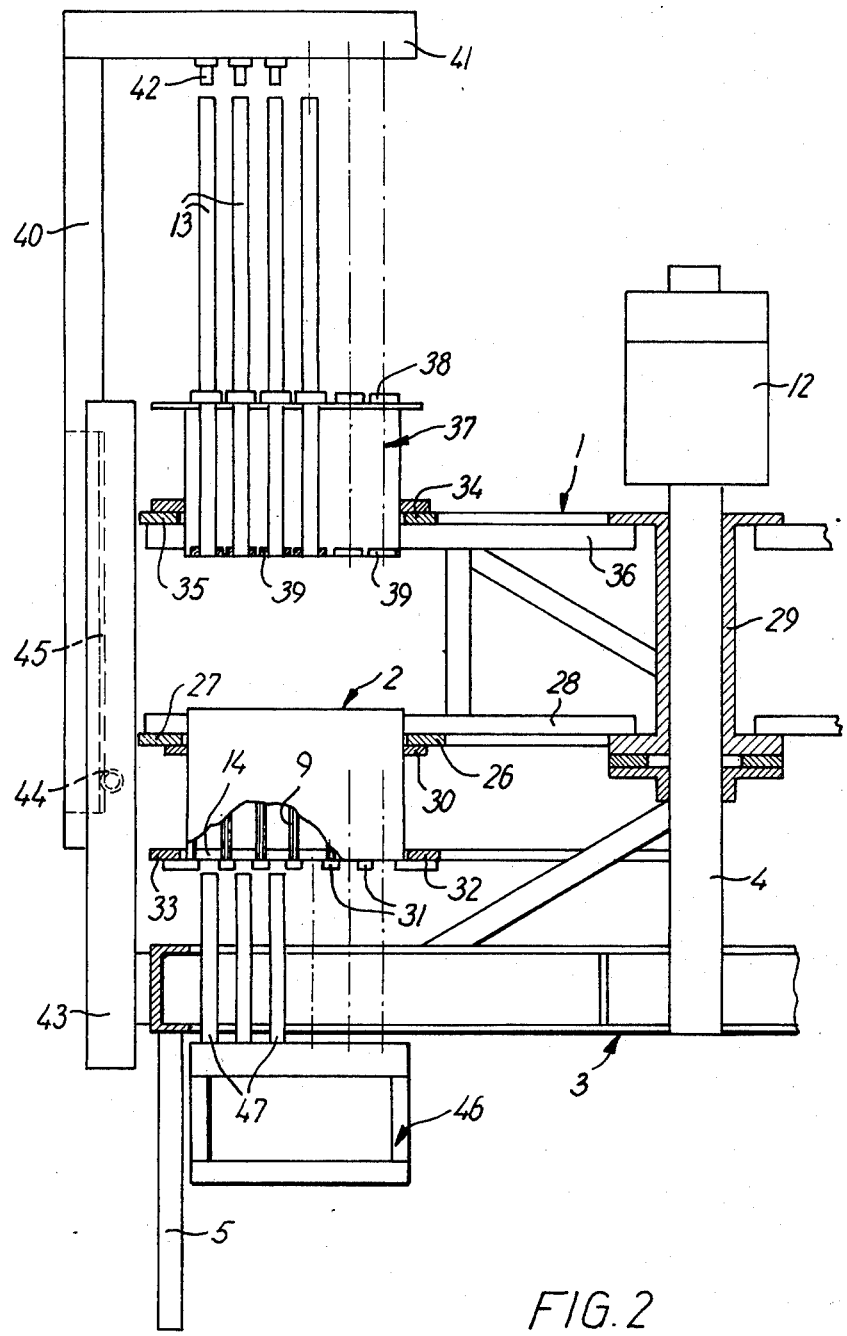
FIG. 2 is a vertical radial section, on a larger scale, through a little more than one half of the apparatus, the lower part of the figure illustrating the station in which the finished product is withdrawn, while the upper part illustrates the station in which tubular core members are inserted in the mould cylinders of the apparatus.

As intimated in FIGS. 1 and 2 heating and cooling medium, which may be water at about 90° and about 35°C, respectively, is supplied through stationary ducts 10 and 11 to a distributor 12 arranged at the upper end of column 4. The part of the distributor 12, which rotates together with the turret 1, is connected with the individual mould sectors by means of ducts (not shown) preferably comprising flexible hoses. In the distributor or in the individual connecting ducts there may be provided valves which control the supply of heating and cooling medium to the mould sectors and which switch between heating and cooling at suitable times during the working cycle. This is schematically indicated in FIG. 1 by means of a station IV in which the supply of heating medium ceases and the supply of cooling medium commences, and a station V in which the valves switch from cooling to heating, in the embodiment shown simultaneously with the withdrawal of the finished products. It will be appreciated that the apparatus may be provided with means for varying or adjusting the location of station IV so that the duration of the heating period, in which the product forming raw materials are coagulated in the mould cylinders 9, may be changed.

In a station I located shortly after station V the depression of a bottom plug through each mould cylinder, which is described in more detail in our copending application entitled "Apparatus for preparing edible products" Dk 6241/74 and claiming priority from Danish patent application No. 6241/74 filed Nov. 29, 1974, occurs together with a lubricating of the cylinder walls.

In a subsequent station II a core tube 13 is first inserted in each mould cylinder 9 in sealing contact with the bottom plug 14 of the mould, and thereafter a metered amount of egg-white mass is supplied to the annular space between core 13 and the inner wall of mould 9. For supplying the egg-white there may be provided a unit comprising a piston pump 15 associated with each mould and a valve block 16 having discharge ducts, preferably short flexible hoses ending shortly above the mould cavities, and a supply duct 17 through which egg-white mass is conveyed from a storage tank 18 through a preheater 19.

During the intermittent rotation of each mould sector 2 from station II to station III, a preliminary coagulation of the egg-white mass between cores 13 and moulds 9 occurs, and in station III the coagulation has proceeded so far that the shell of egg-white mass, while still being relatively soft, has attained a suitable internal coherence. In station III the tubular cores 13 are withdrawn upwardly from the moulds and after the withdrawal a metered amount of preheated egg-yolk mass is supplied to each of the central cavities left by the withdrawn cores. For supplying the yolk mass there is provided a unit similar to that used for supplying the egg-white mass, and which comprises a plurality of piston pumps 20, a valve block 21 with discharge ducts (not shown) leading to the individual moulds and a supply duct 22 connected to a storage tank 23 through a preheater 24. In view of the relatively soft consistency of the partially coagulated egg-white it is desirable that the supply of yolk mass is effected as far as possible centrally to said cavity, and the apparatus may comprise means (not shown) for mechanically displacing the discharge aperture of the discharge ducts issuing from valve block 21 between said central position which they assume during the metering operation, and a second position in which they are clear of the tubular cores 13.

During the continued rotation of the mould sector 2 to the previously mentioned station IV, the final coagulation of both egg-white and yolk occurs, and as previously mentioned the coagulation process is interrupted by the supply of cooling medium through the jacket of the mould sector in the interval between stations IV and V. In the latter station the six bottom plugs 14 of each mould sector are simultaneously pushed upwardly whereby they raise the finished products above the top cover plate of the mould sector. The products are gripped by means of a device (not shown) which swings them beyond the periphery of the turret and deliver them, e.g. to the schematically shown inlet end 25 of a packaging machine (not shown). In the packaging machine, which may be of any suitable and known design, each product may be packaged in a suitable way, e.g. wrapped in a surrounding sheet material in which the products may be distributed.

As intimated in FIG. 2 the turret 1 may comprise two concentric rings 26 and 27 located in a common plane, and radial spokes 28 connecting the rings with each other and with a centrally located bearing sleeve 29 by means of which the turret is supported on column 4. The mould sectors 2 have radially projecting tabs 30 for bolting them to rings 26 and 27. To the underside of the lower cover plates there are secured abutment strips 31, which slightly overlap the lower openings of each mould 9 so that they function as stop means for defining the lowermost position of the bottom plugs 14. Two rings 32 and 33, to which the mould sectors 2 are bolted at the lower end are rigidly connected with rings 26 and 27 by suitable means (not shown).

The turret further comprises two concentric rings 34 and 35 which are located in a common plane and connected to sleeve 29 by means of radial spokes 36. As indicated in FIG. 2 rings 34 and 35 may also be rigidly connected with subjacent rings 26 and 27. Above each mould sector 2 a frame 37 for holding the cores 13 associated with the mould sector is bolted to rings 34 and 35. Each holding frame has upper and lower bearings 38 and 39, respectively, for laterally supporting associated cores 13, and in the stations II and III there are provided stationary devices along the periphery of the turret for inserting and withdrawing, respectively, a core 13 in each associated mould 9. The device for inserting the cores, which is schematically shown in FIG. 2, comprises a vertically displaceable column 40, which at its upper end carries a boom 41 extending radially inwardly and having gripper means 42 for aligning and depressing each core 13 when the column is lowered. The column is suitable guided, e.g. by means of rollers and cooperating guide rails (not shown) in a stationary guide 43 which is secured to frame 3. The column is raised and lowered by means of a pinion 44 journalled in guide 43 and driven by a motor (not shown), which pinion meshes with a rack 45 secured to column 40. A similar device, in which the means for gripping the cores may be slightly modified, is arranged in station III in which the cores are withdrawn before the yolk mass is supplied.

The raising of the bottom plugs 14 and of the finished products in station V is effected by means of device schematically shown in FIG. 2 and comprising a frame 46 which on its upper side carries six push rods 47. When frame 46 is lifted, the rods 47 engage the underside of the bottom plugs 14 and push the plugs and the coagulated products upwardly through the cylinders. The reciprocation of frame 46 may be effected by means of a mechanism (not shown) comprising a rack secured to each of the vertical frame members and two pinions meshing with the racks and secured to a common motor driven shaft, which ensures an exactly rectilinear and uniform raising of all push rods 47. It will be appreciated that frame 46 must also be suitably guided for reciprocation, e.g. similar to the guiding of column 40 in guide 43 described above.

Figure 6:
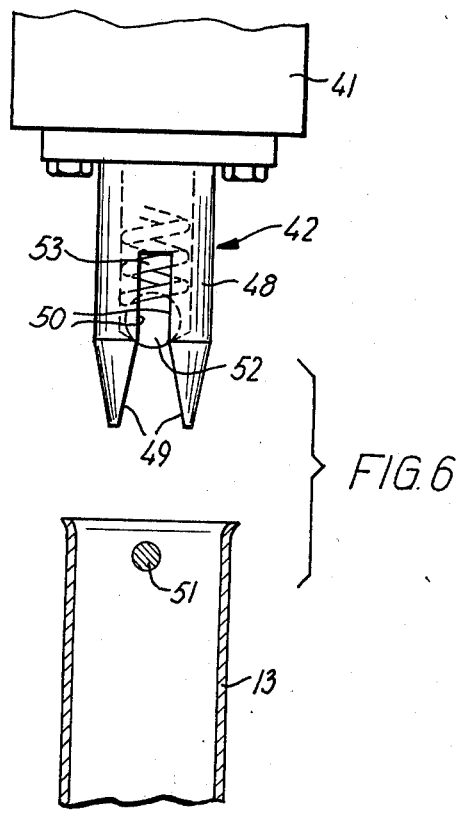
FIG. 6 is an elevation on a larger scale showing a gripper means in the core insertion station and the uppermost end of a core.

After the withdrawal of the finished products in station V, if desired followed by a cleaning of the upper faces of bottom plugs 14, the plugs are pushed downwardly to their lowermost position engaging the abutment strips 31. This occurs in station I, and in the following station II which is illustrated in FIGS. 3–7, a core is inserted in each mould into sealing engagement with the bottom plug 14 by means of the gripper means 42 shown. Each gripper means comprises a sleeve 48 which is bolted to the underside of boom 41, and at the lower end of which a V-shaped notch is formed by two flat surfaces 49. The surfaces 49 merge into two parallel surfaces 50 in which a coupling pin 51 secured in the upper end of core 13 and extending diagrametrically therethrough, may be received with a certain play. As shown in FIG. 6 the upper end of core 13 may be outwardly flanged, and the outer surface of sleeve 48 tapers downwardly so as to ensure that the sleeve moves into the core when boom 41 is lowered. A ball 52 is normally held in engagement with an upwardly facing shoulder within sleeve 48 by means of a compression spring 53, and the upper end of spring 53 engages a plug (not shown) which is secured in the upper end of the sleeve bore.

The previously mentioned bearing 38, which supports the core 13 at the upper side of frame 37, carries a bifurcated arm 54, which is pivotally supported on a horizontal axis, and a roller 55, which may be made of plastics material, is rotatably journalled in arm 54. A spring (not shown) biases arm 54 and hence roller 55 inwardly towards core 13. The lower bearing 39 for laterally supporting core 13 may be formed with a scraper edge 56 at its lower end, which edge serves for cleaning the outer surface of the core during the withdrawal thereof from the mould. Core 13 is formed with two diametrically opposite depressions 57, and as shown in FIG. 3 roller 55 may engage in one of the depressions when the core has been lifted to its uppermost position whereby the roller may hold the core against axial displacement and rotation during the travel of frame 37 from station III to station II. The diametrically opposite depressions ensure that when the core tube has been removed from the machine, e.g. for cleaning purposes, it will always be correctly mounted relative to the coupling means in station II and III, when the core is again mounted in the frame.

FIGS. 4 and 7 show the core in its lowermost position to which it is moved when column 40 and boom 41 are lowered. In this position a sealing engagement between core 13 and the upper surface of bottom plug 14 is ensured by means of a sealing ring 58 secured in the lower end of the core. In this position the spring force acting upon arm 54 has pivoted roller 55 inwardly over the upper end of core 13 so that the spring maintains a suitable contact pressure between bottom plug 14 and sealing ring 58.

For withdrawing cores 13 in station III there is employed the device shown in FIGS. 8-11 and which comprises a gripper 59 associated with each core. The grippers 59 are mounted on a horizontal boom 60, which is secured to the upper end of a vertically displaceable column (not shown) similar to column 40 and boom 41 in station II. Each gripper 59 comprises an external sleeve 61 which is bolted to the underside of boom 60, and which at its lower end is formed with two diametrically opposite hooks 62, each having an upwardly facing horizontal surface capable of engaging with the coupling pin 51 of core 13, see FIG. 10. A gripper pin 63 is rotatably guided internally of sleeve 61. The lowermost end of pin 63 is shaped with a notch formed by two flat, inclined surfaces 64 which merge into two parallel surfaces 65 between which pin 51 may be received with a suitable play. The upper end of pin 62 is drivingly connected with a gear wheel 66 engaging with a rack 67 extending longitudinally through boom 60. The rack is secured to an actuating mechanism (not shown) which may comprise a pneumatic ram arranged to shift the rack longitudinally and thereby rotate all pins 63 on their axes.

At its radially innermost end boom 60 may be provided with a centering means, e.g. a vertical sleeve, which in the lowered position of the boom engages with a second centering means, e.g. and upwardly extending pin, secured to turret 1, which ensures the desired position of boom 60 and grippers 59 relative to the respective cores 13. The correct engagement between the grippers and the pins 51 in cores 13 may further be facilitated when sleeves 61 are slightly movable relative to boom 60, and when a corresponding slight play is provided between each pin 63 and the associated stub shaft of gear wheel 66, which shaft should be rigidly supported in boom 60 in order to ensure proper engagement with rack 67.

During the lowering of boom 60 and grippers 59 towards turret 1, the component parts of the grippers assume the relative position shown in FIG. 8, i.e. rotated about 90° as compared to the position shown in FIGS. 10 and 11. Consequently, the notches formed by surfaces 64 and 65 are aligned with pin 51 which furthermore may pass freely between the front edge of each hook 62 and the rear face of the other hook. When boom 60 has been lowered to a position in which the upper surfaces of hooks 62 are located below pin 51, the rack 67 is shifted longitudinally whereby pins 63 are rotated approximately 90° to the position of FIGS. 10 and 11, and this causes a simultaneous rotation of core 13 relative to mould 9 until pin 51 is trapped between the two hooks 62 of sleeve 61 and the bottom of the V-shaped notch in pin 63. When boom 60 is subsequently raised, the grippers pull cores 13 to their uppermost or retracted position shown in FIGS. 2 and 3. Shortly before the boom 60 assumes its uppermost position, pins 63 and hence cores 13 are rotated backwardly by means of rack 67 so that cores 13 remain stationary, cf. FIGS. 3 and 8, during the final movement of the boom and the grippers to their uppermost position.

Subsequently, the turret is rotated one further step, and the boom is lowered for withdrawing the next set of cores from a mould sector 2.

It will be appreciated that the devices for inserting and withdrawing cores into and from the associated moulds may also be employed in the manufacture of other products than those described above and in which the starting materials are egg-white and yolk mass, respectively, to which other edible constituents, colouring agents, flavouring additives or preservatives may be added, if desired.

It may be mentioned that the device provided in station I for pressing down the bottom plugs 14 and lubricating the mould walls is located in the free vertical space between the upper side of the mould sectors 2 and the lower side of the associated frames 37 which support the tubular cores. Consequently, the cores may remain in their fixed orientation axially aligned with the associated mould cylinders during the rotation of the turret. Also the briefly mentioned device for withdrawing the finished products will be designed with a height such that the components thereof, which have to move within the outer periphery of the turret, may be accommodated in said vertical space.

In the embodiment of the invention described above the bottom plugs of the moulds are displaced upwardly through the moulds for withdrawing the finished products, but the invention may also be utilized in apparatus in which bottom plugs are pivotally mounted below the moulds so that the finished products may be withdrawn downwardly after the plugs have been pivoted clear of the moulds. When a product withdrawal in this way is possible, the necessary lifting height of the cores and hence the total height of the apparatus can be reduced because it is then only necessary to raise the cores to such an extent that their lower ends are clear of the upper edges of the moulds.

In the embodiment described in detail above the egg-white is supplied first to the mould and partly coagulated, following which the core member is withdrawn and the yolk is supplied to the cavity left by the core member. In some cases it may however alternatively be possible to supply the egg-white and the product core forming material simultaneously at the outer and inner side, respectively, of a tubular core member and to withdraw the core member after a preliminary coagulation of at least the egg-white, similar to what is described in U.S. Pat. specification No. 3,823,659 referred to above.

Even if the invention has been described above as an apparatus for preparing an egg product, it will be understood that it may have utility also in connection with the manufacture of other products which include a core and an outer shell consisting of materials which can be supplied to the respective mould cavities in fluent or flowable state and subsequently solidify in the mould by any suitable means promoting chemical and-/or physical changes in the materials.

What we claim is:

1. Apparatus for preparing an elongated edible product including a cylindrical core comprising a first product component and a surrounding cylindrical shell comprising a second product component, the apparatus comprising:
    a plurality of vertically oriented cylindrical moulds open at their upper ends and closed at their lower ends,
    means for cyclically moving said moulds through a plurality of stations including a station for inserting a core member in each mould, a station for withdrawing the core member from the mould, at least one station for supplying said second product component in a flowable state to the annular space defined between the inner wall of the mould and said core member and supplying said first product component in a flowable state to the space formed by the core member, and a station for withdrawing the finished products from the moulds,
    means between said material supply station and said product withdrawal station for causing the product components to solidify,
    a frame rigidly connected with said moulds so as to move in unison therewith, means on said frame for slidingly supporting a plurality of said core members with one core member located above each mould,
    first gripper means in said core insertion station for cooperating with said core members, and drive means for vertically reciprocating said first gripper means,
    second gripper means in said core withdrawal station for cooperating with said core members, and drive means for vertically reciprocating said second gripper means,
    said first and second gripper means and said core members having interengageable coupling means shaped so as to define a fixed angular position of each core member relative to said frame when said coupling means are engaged.

2. Apparatus as claimed in claim 1, wherein the coupling means on said core member is a radially extending coupling pin and the coupling means on said first and second gripper means includes a downwardly divergent, V-shaped notch for receiving said pin.

3. Apparatus as claimed in claim 2, wherein at least the upper end of said core member is hollow and the coupling pin extends transversely through the core member.

4. Apparatus as claimed in claim 3, wherein said first gripper means in the core insertion station comprises a sleeve in which said V-shaped notch is formed, a ball located within said sleeve and spring means biasing said ball downwardly to engage with the coupling pin when the latter is located in the bottom of the V-shaped notch.

5. Apparatus as claimed in claim 3, wherein said second gripper means in the core withdrawal station comprises a sleeve, a centrally located gripper member surrounded by said sleeve and formed with said V-shaped notch, two opposed, upwardly open hooks being provided at the lower end of said sleeve and shaped for engaging below said coupling pin, and means for effecting a relative rotation of said sleeve and said centrally located gripper member.

6. Apparatus as claimed in claim 5, comprising a vertically movable carrier to which said sleeve is rigidly secured.

7. Apparatus as claimed in claim 1, further comprising a plurality of pressure pads, one associated with each core member, mounted on said frame, and spring means biasing each pressure pad radially inwards against the associated core member.

8. Apparatus as claimed in claim 7, in which each pressure pad is supported by a holder connected to said frame for pivoting movment on a horizontal axis located outside the periphery of the core member.

9. Apparatus as claimed in claim 7, wherein said pressure pad is a rotatably supported roller.

10. Apparatus as claimed in claim 7, wherein the lateral wall of each core member is formed with a depression in which the associated pressure pad may engage when the core member is lifted clear of the mould.

11. Apparatus as claimed in claim 10, wherein two depressions are provided diametrically opposite one another in the wall of the core member.

12. Apparatus as claimed in claim 1, in which said moulds are arranged in groups, each consisting of a plurality of moulds located side by side in a row, and in which said second gripper means are mounted on a common holder provided with means for aligning each gripper relative to the associated core member when the holder is in its lowermost position.

* * * * *